(12) United States Patent
Chin et al.

(10) Patent No.: US 11,320,339 B2
(45) Date of Patent: May 3, 2022

(54) SYSTEM FOR TESTING ENGINE STARTER

(71) Applicant: DENSO International America, Inc., Southfield, MI (US)

(72) Inventors: Daniel Chin, Murrieta, CA (US); Ryo Yamaguchi, Anjo (JP); Yoshimichi Nishida, Corona, CA (US); Dong Ju Park, Wildomar, CA (US)

(73) Assignee: DENSO International America, Inc., Southfield, MI (US)

( * ) Notice: Subject to any disclaimer, the term of this patent is extended or adjusted under 35 U.S.C. 154(b) by 268 days.

(21) Appl. No.: 16/788,397

(22) Filed: Feb. 12, 2020

(65) Prior Publication Data
US 2021/0247271 A1 Aug. 12, 2021

(51) Int. Cl.
*G01M 15/02* (2006.01)
*G01M 15/04* (2006.01)
*F02N 11/10* (2006.01)
*F02N 11/08* (2006.01)

(52) U.S. Cl.
CPC ......... *G01M 15/044* (2013.01); *F02N 11/108* (2013.01); *F02N 11/0859* (2013.01)

(58) Field of Classification Search
CPC ... G01M 15/044; G01M 15/02; F02N 11/108; F02N 11/0859
See application file for complete search history.

(56) References Cited

U.S. PATENT DOCUMENTS

| | | | | |
|---|---|---|---|---|
| 2,446,039 A | * | 7/1948 | Bennett | G01L 3/18 73/114.59 |
| 6,717,282 B1 | * | 4/2004 | Maxwell | F02N 11/04 290/40 B |
| 6,986,292 B2 | * | 1/2006 | Kemnade | G01M 15/046 73/862.191 |
| 7,096,746 B2 | * | 8/2006 | Kemnade | G01M 15/046 73/862.191 |
| 7,640,795 B2 | * | 1/2010 | Raichle | H02P 7/0094 73/114.62 |
| 7,937,993 B2 | * | 5/2011 | Raichle | H02P 7/0094 73/114.59 |
| 9,128,156 B2 | * | 9/2015 | Jardine | G01R 31/34 |
| 9,453,781 B2 | * | 9/2016 | Kokal | G01M 15/02 |
| 2004/0118194 A1 | * | 6/2004 | Raichle | F02N 11/10 73/114.62 |
| 2005/0016295 A1 | * | 1/2005 | Kemnade | G01M 15/046 73/862.28 |
| 2008/0023547 A1 | * | 1/2008 | Raichle | G01R 31/34 235/462.13 |
| 2010/0101312 A1 | * | 4/2010 | Raichle | F02N 11/10 73/114.62 |
| 2013/0297247 A1 | * | 11/2013 | Jardine | G01R 31/34 702/113 |
| 2014/0366616 A1 | * | 12/2014 | Kokal | G01M 15/02 73/116.05 |

\* cited by examiner

*Primary Examiner* — Freddie Kirkland, III
(74) *Attorney, Agent, or Firm* — Harness, Dickey & Pierce, P.L.C.

(57) ABSTRACT

A performance testing system including an engine, a starter under test that is configured to start the engine, and a motor configured to generate power transferred to the engine to run the engine after the engine is started by the starter.

20 Claims, 3 Drawing Sheets

FIG - 3

| Stage | Test Condition | Description | Start Time (sec) | End Time (sec) |
|---|---|---|---|---|
| Intialization | Ignition = ON | Establish connection between battery and starter | | |
| | Induction Motor = ON<br>Induction Motor Speed = 200 RPM | Turn ON induction motor and rotate at 200 RPM (to match with starter cranking speed).<br><br>The induction motor and engine flywheel rotate at the same speed when the clutch is engaged in order to avoid excessive stress from static torque. | 0.00 | 2.00 |
| Crank | Starter Power = ON | Supply power to starter - start engine cranking | 2.00 | 3.00 |
| | Clutch = ON | Engage EM clutch to connect induction motor to engine flywheel/ crank shaft | | |
| Overrun | Induction Motor Speed = 800 RPM | Accelerate induction motor speed to 800 RPM (to mimic combustion acceleration speed) | 3.00 | 4.00 |
| | Induction Motor Speed = 700 RPM | Reduce induction motor speed to 700 RPM (idle speed) | | |
| End Crank | Starter Power = OFF | Remove power from starter - end of cranking cycle | 4.00 | 4.00 |
| Running @ Idle Speed | Induction Motor Speed = 700 RPM | Keep the induction motor running at 700 RPM for an additional 4 seconds | 4.00 | 8.00 |
| Rest + Battery Charge | Ignition = OFF | Remove battery connection to starter | 8.00 | 30.00 |
| | Clutch = OFF | Disengage clutch | | |
| | Induction Motor Speed = 0 RPM | Stop Induction motor rotation | | |
| | Battery Charge = ON | Enable power supply to charge the battery | | |

SYSTEM FOR TESTING ENGINE STARTER

FIELD

The present disclosure relates to a system for testing a starter for an engine.

BACKGROUND

This section provides background information related to the present disclosure, which is not necessarily prior art.

A starter is used to initiate operation of an internal-combustion engine by rotating (or cranking) the engine's crankshaft. After being started by the starter, the engine is able to run under its own power. To ensure effectiveness and reliability, the starter may be subject to an endurance cranking test.

In general, there are two ways to perform an endurance cranking test for a starter. First is to use a live engine test bench that consumes actual fuel and generates combustion. Second is to use an electronic engine simulator including a programmable motor that mimics a live engine's operating characteristics. Such conventional ways of testing have various disadvantages.

With respect to live engine testing, it is often restricted or prohibited by environmental regulations. With respect to electronic engine simulators, especially for a heavy duty application, they are extremely expensive, not readily available, and are unable to replicate actual engine behavior under all conditions. There is thus a need in the art for an improved endurance cranking test for engine starters. The present disclosure includes a new and non-obvious endurance cranking test for starters having the features and advantages set forth herein. One skilled in the art will appreciate that the present disclosure provides numerous additional advantages and unexpected results as well.

SUMMARY

This section provides a general summary of the disclosure, and is not a comprehensive disclosure of its full scope or all of its features.

The present disclosure provides for a performance testing system. The system includes an engine, a starter under test that is configured to start the engine, and a motor configured to generate power transferred to the engine to run the engine after the engine is started by the starter.

The present disclosure further provides for a method for performing a performance test. The method includes starting an engine with a starter under test, and running the engine with an electric motor after the engine has been started by the starter.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 3 illustrates a method in accordance with the present disclosure for testing a starter for an engine.

Corresponding reference numerals indicate corresponding parts throughout the several views of the drawings.

DETAILED DESCRIPTION

Example embodiments will now be described more fully with reference to the accompanying drawings.

Figure 1:
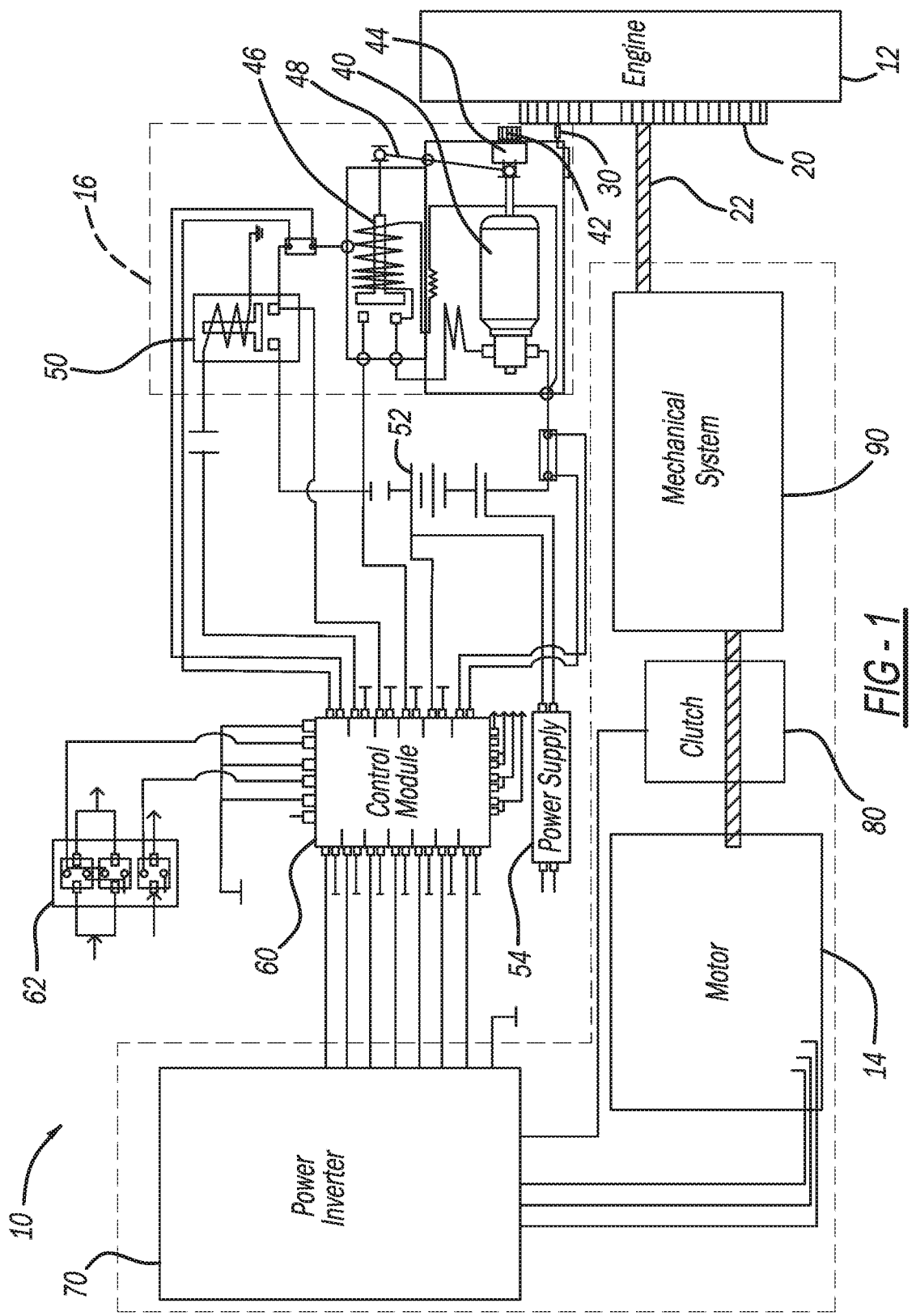
FIG. 1 illustrates a system in accordance with the present disclosure for testing a starter for an engine.

FIG. 1 illustrates an exemplary endurance cranking test system 10 in accordance with the present disclosure. The system 10 generally includes an engine 12, a motor 14, and a starter 16 for the engine 12. The system 10 tests the ability of the starter 16 to successfully start the engine 12 without generating engine exhaust or requiring fuel to run the engine.

The engine 12 may be any suitable internal-combustion engine. For example, the engine 12 may be any suitable heavy duty engine, such as a Cummings ISX 15 L engine. The engine 12 is a "live" engine including all of the components of a typical internal-combustion engine, but fuel and combustion is effectively replaced by any suitable motor, such as the motor 14, which may be an induction motor or any other suitable electric motor. The motor 14 is configured to turn on and off at certain speeds, and accelerate at an exact time frame during each cranking cycle of the engine 12. The system 10 advantageously replaces the actual combustion of the engine 12 with power from the motor 14 at a specific time during cranking of the engine 12. Because the engine 12 is a "live" engine (other than combustion and fuel consumption) actual engine characteristics can be measured, such as engine resistance, torque, and RPM to assess current, power, and performance of the starter 16 being tested. The system 10 may be configured to perform any other suitable test in addition to, or in place of, an endurance cranking test. For example, the system 10 may be configured to perform any type of engine cranking performance measurement and/or endurance test such as cold temperature cranking, hot temperature cranking, speed/torque measurements, and/or any suitable dynamometer testing.

With continued reference to FIG. 1, the system 10 will now be described in additional detail. The engine 12 includes a ring gear 20. The ring gear 20 is mounted to a crank shaft 22, which extends from the engine 12 through the ring gear 20. A tachometer 30 is included to measure the revolutions per minute (RPM) of the ring gear 20.

The starter 16 may be any starter suitable for starting the engine 12, such as a heavy duty starter suitable for starting heavy duty engines, such as a Cummings ISX 15 L engine for example. The starter 16 generally includes an armature 40, which rotates a pinion 42. The armature 40 selectively engages with, and disengages from, the pinion 42 by way of a clutch 44. A main solenoid 46 of the starter 16 is configured to move a lever 48, which actuates the clutch 44. Actuation of the main solenoid 46 is controlled by any suitable switch, such as an integrated magnetic switch (IMS) solenoid 50. The IMS solenoid 50 is powered by one or more batteries 52. The batteries 52 may be charged by any suitable power supply 54.

The system 10 further includes any suitable control module 60. In this application, including the definitions below, the term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the control module 60 described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The control module 60 receives various inputs by way of relays 62. One such input is an ignition input. In response to receipt of an ignition input, the control module 60 powers the starter 16 and actuates the IMS solenoid 50. Actuation of the IMS solenoid 50 results in actuation of the main solenoid 46, which moves the lever 48 and moves the pinion 42 into cooperation with the ring gear 20. Rotation of the pinion 42 by the armature 40 rotates the ring gear 20 and the crank shaft 22 mounted thereto to start the engine 12. The control module 60 is also configured to control the starter 16 to move the pinion 42 out from engagement with the ring gear 20 after the engine 12 has been started.

The control module 60 is further configured to control the motor 14 by way of a power inverter 70. The power inverter 70 is configured to control various operating parameters of the motor 14, such as, but not limited to, the following: activation, deactivation, speed, acceleration, deceleration, etc. Specific control of the motor 14 during testing of the starter 16 is described in detail herein.

The motor 14 is selectively coupled to, or decoupled from, the crank shaft 22 by way of a clutch 80. The clutch 80 may be any suitable clutch, such as an electromagnetic clutch. Between the clutch 80 and the crank shaft 22 may be any suitable mechanical system 90 configured to dampen stress caused by high torque occurring when the clutch 80 connects the motor 14 to the crank shaft 22 by way of the mechanical system 90. The mechanical system 90 may include one or more of any suitable pulley, belt, coupling, shaft, and auto tensioner, for example.

Figure 2:
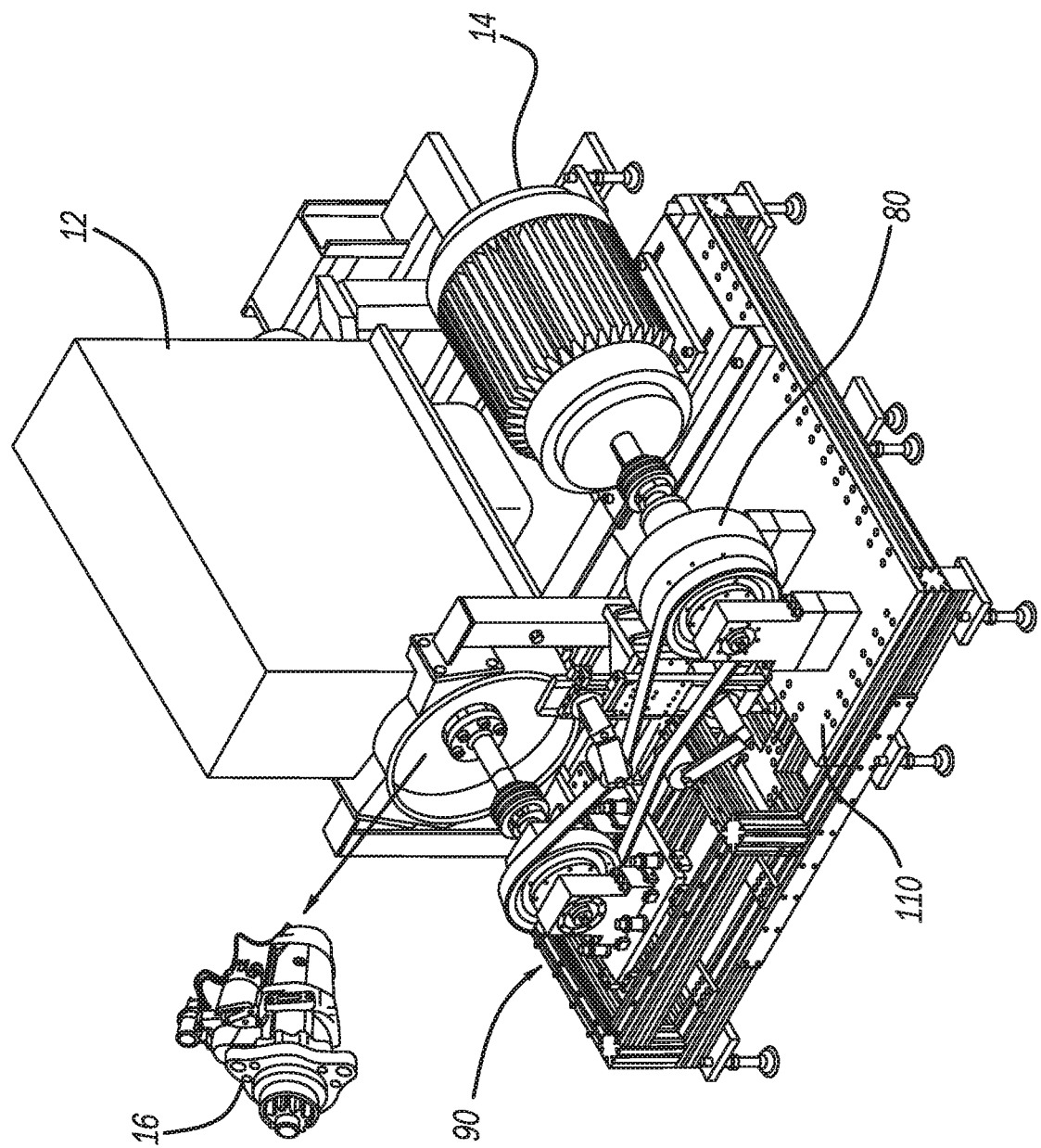
FIG. 2 illustrates additional details of the system of FIG. 1.

FIG. 2 illustrates an exemplary test bench 110, to which any suitable components of the system 10 may be mounted. The test bench 110 may be configured as a mobile assembly that can be readily transported to different locations. In the example of FIG. 2, the following components of the system 10 are mounted to, or indirectly to, the test bench 110: the engine 12, the motor 14, the starter 16, the clutch 80, and the mechanical system 90. The control module 60 and the power inverter 70 may also be mounted to the test bench 110, may be arranged closely adjacent thereto, or may be arranged at any suitable remote locations. In addition to the arrangement of FIG. 2, the engine 12, the motor 14, the starter 16, the clutch 80, and the mechanical system 90 may be arranged in any other suitable configuration as well. For example, the engine 12, the motor 14, the starter 16, the clutch 80, and the mechanical system 90 may be arranged linearly rather than in the generally "U" shaped arrangement of FIG. 2 in which the engine 12 and the motor 14 are oriented parallel to each other. Further, the mechanical system 90 is optional and may be eliminated such that the engine 12 and the motor 14 are directly connected by way of the clutch 80.

FIG. 3 illustrates an exemplary method for performing an endurance cranking test in accordance with the present disclosure at reference numeral 210. The method 210 may be performed using the system 10 of FIGS. 1 and 2, or any other suitable system for performing an endurance cranking test of an engine starter, such as the starter 16. The method 210 is described as being performed by the system 10 for exemplary purposes only.

As shown in FIG. 3, the method 210 for performing an endurance cranking test begins at an initialization stage. The initialization begins with activation of an ignition switch, which generates an ignition input to the control module 60. In response to the ignition input, the control module 60 powers up the starter 16 and the motor 14. The control module 60 accelerates the motor 14 to a speed that is the same as, or about the same as, a speed at which the starter 16 will crank the engine 12. For example, the speed of the motor 14 may be set to 200 RPM, or about 200 RPM. Thus, advantageously the motor 14 and the crank shaft 22 will be rotating at the same speed, or about the same speed, when the clutch 80 is engaged so as to avoid excessive stress from static torque. The initialization stage may have a duration of 2 seconds, or any other suitable period of time.

After the initialization stage, the method 210 proceeds to a crank stage. At the crank stage, the control module 60 actuates the main solenoid 46 of the starter 16 as discussed above, which moves the pinion 42 into cooperation with the ring gear 20 to crank the engine 12. The starter 16 cranks the engine 12 at any suitable speed, such as 200 RPM, for any suitable period of time, such as 1 second.

After the crank stage, the control module 60 initiates an overrun stage. During the overrun stage, the control module 60 operates the clutch 80 to connect the motor 14 to the crank shaft 22, such as by way of the mechanical system 90. The control module 60 then increases the speed of the motor 14 to an acceleration speed to mimic a combustion acceleration speed of the engine 12, which the engine 12 would undergo during typical combustion operation. The acceleration induction motor speed may be any suitable speed, such as 800 RPM, or about 800 RPM. After any suitable period of time, the control module 60 decreases the speed of the motor 14 to an idle speed. The idle speed may be 700 RPM, or about 700 RPM, or any other suitable idle speed. The control module 60 may operate the motor 14 in the overrun stage for any suitable period of time, such as one second, or about one second.

After the overrun stage, the control module 60 powers off the starter 16 during an end crank stage. After the starter 16 is powered off, the control module 60 keeps the motor 14 running at the idle speed (such as at 700 RPM, or about 700 RPM) for any suitable period of time, such as an additional four seconds, during an idle speed stage. After running the motor 14 at the idle speed for the additional four seconds, the method 210 proceeds to a rest and battery charge stage.

At the rest and battery charge stage, the control module 60 powers down the starter 16 in response to the ignition being turned off. The control module 60 also disengages the clutch 80 so that the motor 14 is no longer connected to the engine 12. The control module 60 stops rotation of the motor 14, and recharges the battery 52 for the starter 16 by way of the power supply 54. The rest and battery charge stage may have a duration of 22 seconds, or any other suitable duration. After the rest and battery charge stage is complete, the method 210 may return to the initialization stage, whereby the starter 16 may be tested again. Alternatively, the starter 16 may be replaced with any other suitable starter to be tested. The engine 12 may also be replaced in order to test the ability of the starter 16, or any other suitable starter, to effectively start the engine 12.

The present disclosure thus advantageously provides for a system 10 and a method 210 that eliminates the use of fuel (e.g., diesel fuel) and avoids engine combustion while maintaining use of a live engine when performing an endurance cranking test of a starter, such as the starter 16. By using a live engine, such as the engine 12, actual engine and starter characteristics may be measured and accounted for during the test, such as the engine's resistance, torque, and RPM, which determines starter current. Starter power and starter performance is also accounted for. The system 10 and the method 210 of the present disclosure advantageously eliminates release of engine exhaust to the environment, and consumption of fuel, while maintaining use of live engine characteristics when performing an endurance crank test of a heavy duty starter, such as the starter 16. One skilled in the art will appreciate that the present disclosure provides numerous additional advantages and unexpected results as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A performance testing system, the system comprising:
   an engine;
   a starter under test, the starter configured to start the engine; and
   a motor configured to generate power transferred to the engine to run the engine after the engine is started by the starter.

2. The system of claim 1, wherein the engine is an internal-combustion engine.

3. The system of claim 1, wherein the engine includes a crankshaft turned by the motor after the starter starts the engine.

4. The system of claim 1, wherein the motor is an induction motor.

5. The system of claim 1, further comprising a clutch configured to engage the motor to transfer power from the motor to a crankshaft of the engine, and configured to disengage from the motor to disconnect the motor from the engine.

6. The system of claim 5, further comprising a mechanical system connecting the clutch to the crankshaft of the engine.

7. The system of claim 6, wherein the mechanical system includes at least one of a pulley, a belt, a coupling, a shaft, and an auto tensioner configured to dampen stress generated when the clutch engages the motor.

8. The system of claim 1, further comprising a power inverter configured to control the motor.

9. The system of claim 8, further comprising a control module configured to control activation of the motor, deactivation of the motor, speed of the motor, acceleration of the motor, and deceleration of the motor by way of the power inverter.

10. The system of claim 9, wherein the control module is configured to control a clutch operable to connect the motor to the engine and disconnect the motor from the engine.

11. The system of claim 10, wherein the control module is further configured to control the motor to run at a motor speed that is the same as, or about the same as, a cranking speed of the starter prior to the motor being connected to the engine.

12. The system of claim 11, wherein the control module is configured to control the clutch to engage the motor to transfer power from the motor to the engine after the starter has started the engine.

13. The system of claim 12, wherein after the engine is started by the starter and after the motor is connected to the engine, the control module is configured to accelerate the motor to accelerate the engine to an acceleration speed.

14. The system of claim 13, wherein after the engine reaches the acceleration speed, the control module is configured to decelerate the motor to decelerate the engine to an idle speed.

15. A method for performing a performance test comprising:
   starting an engine with a starter under test; and
   after the engine has been started by the starter, running the engine with an electric motor.

16. The method of claim 15, further comprising running the electric motor at a motor speed that is the same as, or nearly the same as, a cranking speed of the starter prior to connecting the motor to the engine.

17. The method of claim 16, further comprising accelerating the engine with the electric motor to an acceleration speed after starting the engine with the starter.

18. The method of claim 17, further comprising deceleration the engine to an idle speed with the motor after accelerating the engine to the acceleration speed.

19. The motor of claim 15, further comprising transferring power from the motor to the engine by way of a clutch and a mechanical system including at least one of a pulley, a belt, a coupling, a shaft, and an auto tensioner configured to dampen stress generated when the clutch engages the motor.

20. The method of claim 15, the method further comprising performing at least one of an endurance cranking test, a cold temperature cranking test, a hot temperature cranking test, a speed/torque test, and a dynamometer test.

* * * * *